(12) United States Patent
Van Leerdam

(10) Patent No.: US 7,478,015 B2
(45) Date of Patent: *Jan. 13, 2009

(54) SYSTEM FOR MEASURING THE EFFECT OF AN ADSL SPLITTER

(75) Inventor: Huibert Steven Van Leerdam, Amersfoort (NL)

(73) Assignee: Koninklijke KPN N.V., The Hague (NL)

( * ) Notice: Subject to any disclaimer, the term of this patent is extended or adjusted under 35 U.S.C. 154(b) by 626 days.

This patent is subject to a terminal disclaimer.

(21) Appl. No.: 10/736,361

(22) Filed: Dec. 15, 2003

(65) Prior Publication Data

US 2004/0190710 A1    Sep. 30, 2004

Related U.S. Application Data

(60) Provisional application No. 60/436,736, filed on Dec. 27, 2002.

(51) Int. Cl.
G06F 11/30 (2006.01)

(52) U.S. Cl. ..................................................... 702/186

(58) Field of Classification Search ................. 702/186, 702/183, 182, 185, 127; 379/399.01, 399.02, 379/400, 401
See application file for complete search history.

(56) References Cited

U.S. PATENT DOCUMENTS

| | | | |
|---|---|---|---|
| 6,151,335 A * | 11/2000 | Ko et al. ..................... | 370/487 |
| 6,177,801 B1 * | 1/2001 | Chong ......................... | 324/520 |
| 6,417,672 B1 * | 7/2002 | Chong ......................... | 324/520 |
| 6,493,395 B1 * | 12/2002 | Isaksson et al. ............. | 375/261 |
| 6,891,803 B1 * | 5/2005 | Chang et al. ................. | 370/252 |
| 2001/0019608 A1 * | 9/2001 | Lofmark ...................... | 379/398 |
| 2001/0031017 A1 * | 10/2001 | Betts ........................... | 375/265 |
| 2002/0067811 A1 * | 6/2002 | Matsumoto .............. | 379/93.08 |
| 2002/0150122 A1 * | 10/2002 | Arai ............................. | 370/465 |
| 2003/0045756 A1 * | 3/2003 | Mimura et al. .............. | 564/498 |

OTHER PUBLICATIONS

ITU-T G.961, International Telecommunication Union, Mar. 1993, pp. 6-7 and 12.*

* cited by examiner

Primary Examiner—Bryan Bui
Assistant Examiner—Stephen J Cherry
(74) Attorney, Agent, or Firm—McDonnell Boehnen Hulbert & Berghoff LLP

(57) ABSTRACT

Problems arise when using an Integrated Service Digital Network infrastructure for providing Asymmetrical Digital Subscriber Line technology. These problems do not always occur but depend on the distance between the end-user location and the central location, and the type of network termination, and result in the impossibility for the end-user to make voice calls or to send data. The problems are caused by the Asymmetrical Digital Subscriber Line splitters, which change the transmission characteristics of the Integrated Service Digital Network infrastructure between the end-user location and the central location. The transmission characteristics that are changed by the Asymmetrical Digital Subscriber Line splitters are impedance, propagation time and insertion loss. The deviation is frequency-dependent and falls outside the internationally-defined ranges for these transmission characteristics.

7 Claims, 5 Drawing Sheets

SYSTEM FOR MEASURING THE EFFECT OF AN ADSL SPLITTER

RELATED CASES

The present patent application is related to U.S. Provisional Patent Application Ser. No. 60/436,736; filed on Dec. 27, 2002, the full disclosure of which is incorporated herein by reference.

FIELD OF THE INVENTION

The invention relates to a system for measuring the effect of at least one Asymmetrical Digital Subscriber Line splitter.

BACKGROUND OF THE INVENTION

A prior art system is of common general knowledge and measures the effect of the Asymmetrical Digital Subscriber Line (ADSL) splitter solely.

The known system is disadvantageous, inter alia, due to relatively insufficiently explaining why the asymmetrical digital subscriber line (ADSL) splitter in combination with an integrated service digital network (ISDN) infrastructure causes problems to this integrated service digital network (ISDN) infrastructure.

SUMMARY OF THE INVENTION

It is an object of the invention, inter alia, to provide a system which relatively sufficiently explains why the Asymmetrical Digital Subscriber Line (ADSL) splitter in combination with an Integrated Service Digital Network (ISDN) infrastructure causes problems to this Integrated Service Digital Network (ISDN) infrastructure.

The system according to the invention for measuring the effect of at least one Asymmetrical Digital Subscriber Line splitter on at least one transmission characteristic of an Integrated Service Digital Network infrastructure comprises: measuring means for measuring the at least one transmission characteristic falling outside an internationally-defined range for this transmission characteristic.

By measuring that at least one transmission characteristic falls outside the internationally-defined range for this transmission characteristic, it is sufficiently explained why the Asymmetrical Digital Subscriber Line (ADSL) splitter in combination with an Integrated Service Digital Network (ISDN) infrastructure causes problems to this Integrated Service Digital Network (ISDN) infrastructure.

An embodiment of the system according to the invention is defined by the measuring means comprising an impedance meter, with the at least one transmission characteristic comprising an impedance.

The impedance meter allows the measuring of a modulus and a phase of the impedance of (a part of) an infrastructure.

An embodiment of the system according to the invention is defined by the internationally-defined range comprises a mask defined by an ITU-T Recommendation G.961, with a phase of the impedance for some frequencies falling outside this mask.

An embodiment of the system according to the invention is defined by the phase has a positive value between 25 and 48 kHz and between 73 and 100 kHz.

An embodiment of the system according to the invention is defined by the measuring means comprise a propagation time meter, with the at least one transmission characteristic comprising a delay.

The propagation time meter allows the measuring of a delay of signals flowing through (a part of) an infrastructure.

An embodiment of the system according to the invention is defined by the internationally-defined range comprises a mask defined by an ITU-T Recommendation G.961, with the delay falling entirely outside this mask.

An embodiment of the system according to the invention is defined by the measuring means comprise an insertion loss meter, with the at least one transmission characteristic comprising an insertion loss.

The insertion loss meter allows the measuring of an insertion loss of (a part of) an infrastructure.

An embodiment of the system according to the invention is defined by the internationally-defined range comprises a mask defined by an ITU-T Recommendation G.961, with the insertion loss for some frequencies falling outside this mask.

An embodiment of the system according to the invention is defined by the measuring means comprise a BER meter coupled via a Line Termination simulator (9) and at least one Asymmetrical Digital Subscriber Line splitter (4,7) to a Network Termination (3), with the at least one transmission characteristic comprising a correct/incorrect functioning of the Integrated Service Digital Network infrastructure (6) in relation to a cable length of the Integrated Service Digital Network infrastructure (6).

The BER meter allows the measuring of a correct/incorrect functioning of (a part of) an infrastructure.

An embodiment of the system according to the invention is defined by wherein, in case of one Asymmetrical Digital Subscriber Line splitter (4,7) being present, the Integrated Service Digital Network infrastructure (6) functions at least sometimes incorrectly for cable lengths between 1000 and 1600 m, and in case of two Asymmetrical Digital Subscriber Line splitter (4,7) being present, the Integrated Service Digital Network infrastructure (6) functions at least sometimes incorrectly for cable lengths between 400 and 2000 m.

These and other aspects of the invention will be apparent from and elucidated with reference to the embodiments(s) described hereinafter.

DETAILED DESCRIPTION OF THE DRAWINGS

Figure 10:
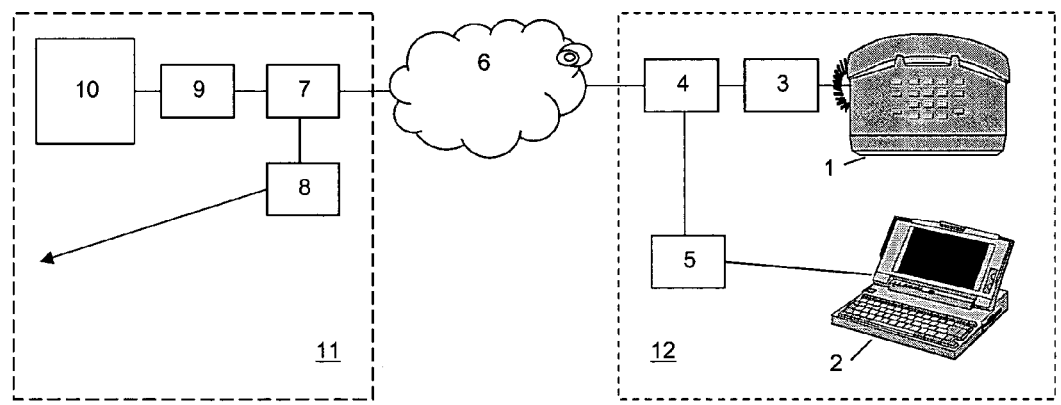
FIG. 10 shows an architecture in which Asymmetric Digital Subscriber Line technology is provided over an Integrated Service Digital Network infrastructure.

The architecture in FIG. 10 shows an architecture in which ADSL (Asymmetric Digital Subscriber Line) is provided over an ISDN (Integrated Service Digital Network) infrastructure. A telephone 1 is connected to a NT (network termination) 3. Another user device at the end-user location 12 is a computer device 2, such as a personal computer. The computer device 3 is connected via an ADSL modem 5 to an ADSL splitter 4. The network termination 3 is connected to the ADSL splitter 4 too. The ADSL splitter 4 is used to separate the data signal from the voice signal. The ADSL splitter 4 is connected to an ISDN infrastructure 6. A central location 11 is at the other end of the ISDN infrastructure 6. The central location 11 provides the end-user with access to a network such as a telecommunication network consisting of telephone exchanges, and data networks such as the Internet.

At the central location 11, another ADSL splitter 7 is connected to the ISDN infrastructure 6. The ADSL splitter 7 is connected to a LT (line termination) 9 and a DSLAM, (Digital Subscriber Line Access Multiplexer) 8. The line termination 9 is connected to a telephone exchange 10 that may be part of a telecommunication network. The DSLAM 8 is connected to a data network, such as the Internet or a broadband network. When a signal is received at the central location 11, the ADSL splitter 7 detects voice calls and data. Voice calls are sent via the line termination 9 to a telecommunication network, and data is sent via the DSLAM 8 to a data network.

This may not succeed when an end-user initiates a voice call using the configuration according to FIG. 10. The same holds for data communication connections initiated by the end-user. This renders it impossible for the end-user to make voice calls or to exchange data via ADSL over ISDN. This invention identifies that the problems are caused by the ADSL splitters 4 and 7. However, these problems do not always occur. The occurrence of the problems depends on the distance between the end-user location 12 and the central location 11, and the type of line termination 3.

It is an object of the invention to identify the problems caused by the ADSL splitters 4 and 7, which arise when ADSL is used over ISDN, and to provide means for solving the problems.

Therefore, this invention discloses that the ADSL splitters 4 and 7 change the transmission characteristics of the ISDN infrastructure 6 between the end-user location and the central location, such as the modulus and the phase of the impedance, the propagation time and the insertion loss. The network termination 3 and the line termination 9 are designed based on transmission characteristics of the ISDN infrastructure 6 between the end-user location 12 and the central location 11 without ADSL splitters 4 and 7. Adding the ADSL splitters 4 and 7 at both sides of the ISDN infrastructure 6 will then result in a network termination 3 and line termination 9 not properly designed for the resulting ISDN infrastructure 6.

It is further identified that the deviation in the transmission characteristics of the ISDN infrastructure 6 between the end-user location 12 and the central location 11 is frequency-related. For certain frequencies, the deviation of the transmission characteristics falls outside the internationally-defined ranges for the transmission characteristics.

The reproducibility of the problem was examined in a test set-up. A set-up was constructed using an LT simulator, a cable of a length variable in steps and an NT1. Splitters could also be included in the connection. Testing took place using an NT1 of the S1 type in the first instance. The test result showed that the problem also occurred in the test set-up and was easily reproducible.

Figure 1:
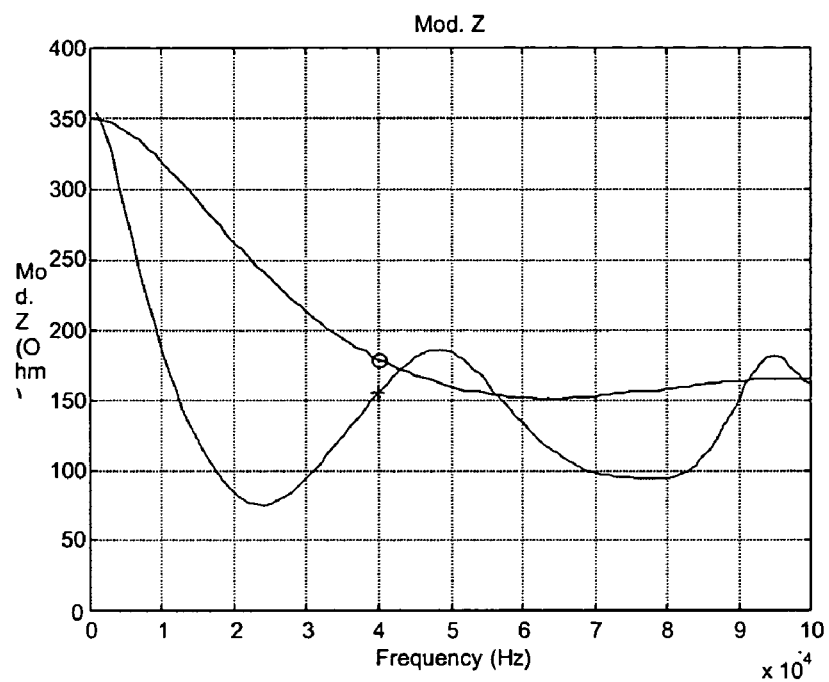
FIG. 1 shows a modulus of a measured impedance Z, for a cable of 1200 m, (o) without splitters and (*) with splitters.
Figure 2:
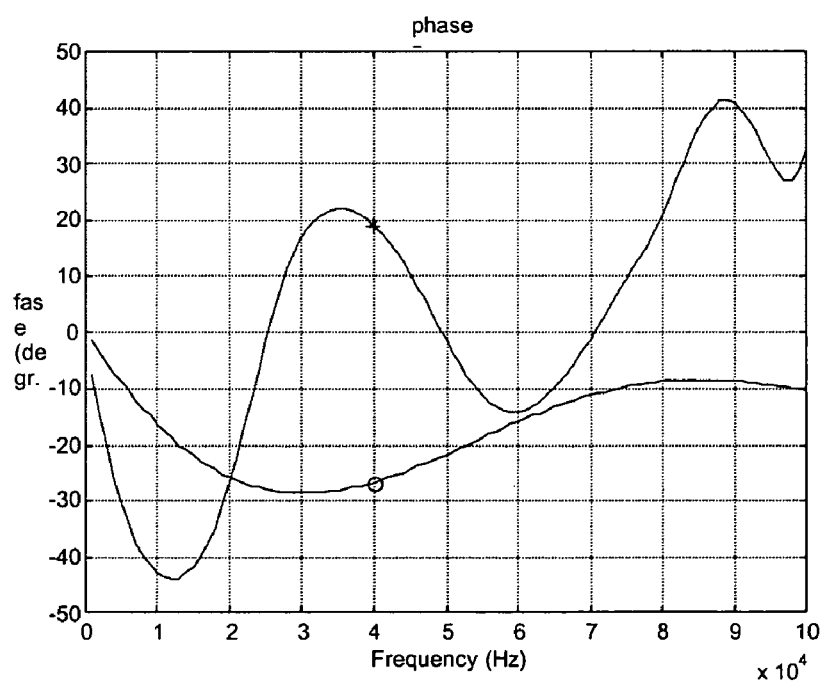
FIG. 2 shows a phase of a measured impedance Z, for a cable of 1200 m, (o) without splitters and (*) with splitters.
Figure 3:
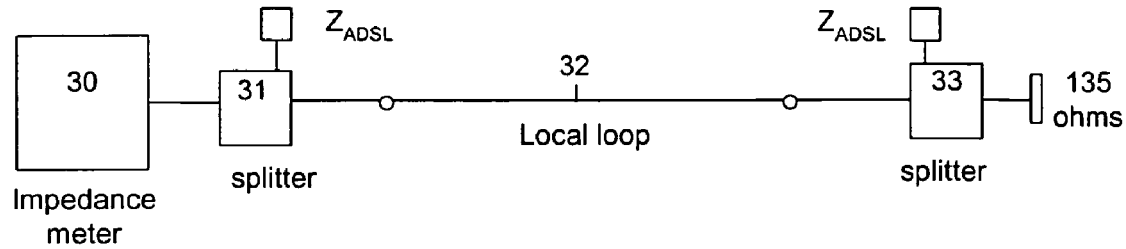
FIG. 3 shows a test set-up for measuring the impedance Z.

Impedance measurements: The next step was performance of impedance measurements on a wire pair with and without one or two splitters at the end. The object of the test was to see to what extent the use of splitters changes the impedance that confronts NT1. The end of the chain was terminated with an impedance of 135Ω. FIG. 1 and 2 show the results. The measured impedance is represented in these Figures as "Z". FIG. 3 shows the test set-up comprising an impedance meter 30, a first splitter 31 (corresponding with splitter 7 in FIG. 10), a local loop 32 (corresponding with ISDN infrastructure 6 in FIG. 10), a second splitter 33 (corresponding with splitter 4 in FIG. 10) and a network termination 34 (corresponding with NT3 in FIG. 10).

It can be seen that the splitters strongly influence the level of impedance (modulus). Swings occur that did not occur without a splitter. The phase characteristic also swings and goes into the positive part, whereas without splitters the phase angle is always negative.

ITU-T Recommendation G.961 contains data for the local line/local loop. Drawing 6/G.961 presents a mask within which the impedance of a local loop will typically occur. The drawing concerned shows only impedance values with a negative phase angle. FIG. 2 shows that positive values were also measured, revealing that for some of the measured frequencies the tested local loop with splitters falls outside the mask in contained in G.961.

Before this test, the impedance (return loss) of the stand-alone splitter was measured and was found to satisfy the requirements, except for a very minor (probably negligible) variance at 79 and 80 kHz.

Figure 4:
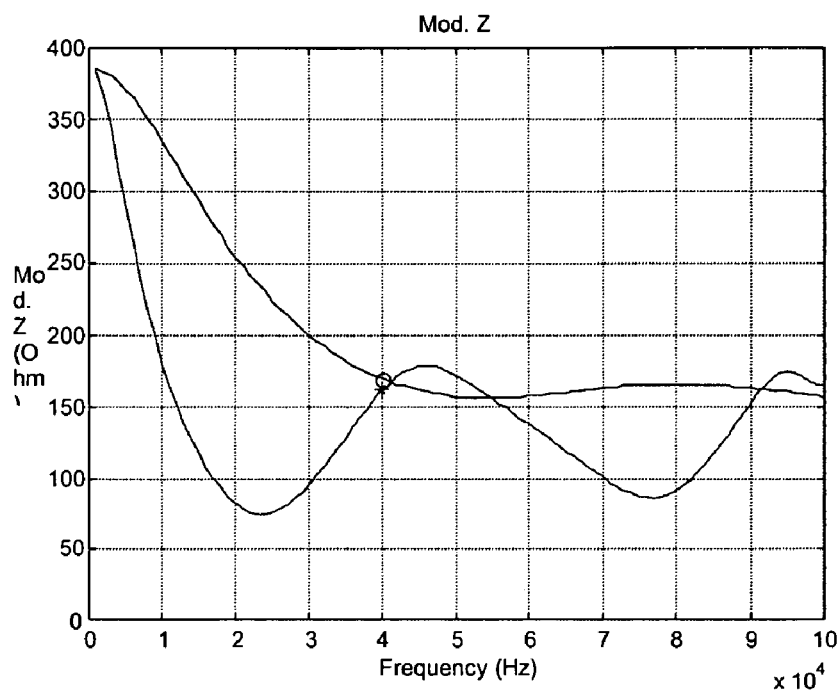
FIG. 4 shows a modulus of a measured impedance Z; for a cable of 1400 m, without and with a splitter.
Figure 5:
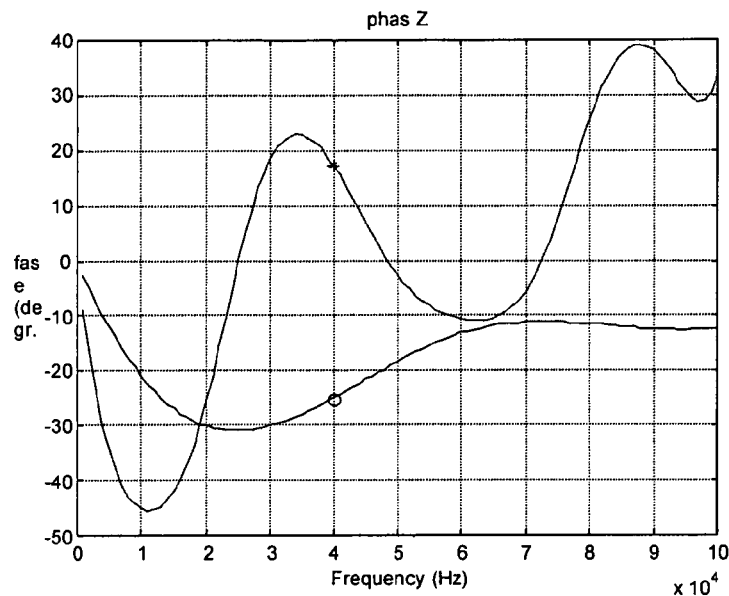
FIG. 5 shows a phase of a measured impedance Z; for a cable of 1400 m, without and with a splitter.

FIGS. 4 and 5 present the results of a similar type of test that was performed with one splitter only. Measurements were taken at the end of the wire pair where the splitter was located. The other end was terminated with a resistance of 135Ω.

There was again a major difference with and without a splitter. Noteworthy is the minor difference compared with FIGS. 1 and 2. It is clearly visible that the splitter at the cable end where no measurements were performed had virtually no further influence on impedance, although this does correspond with the expectable transmission properties.

Figure 6:
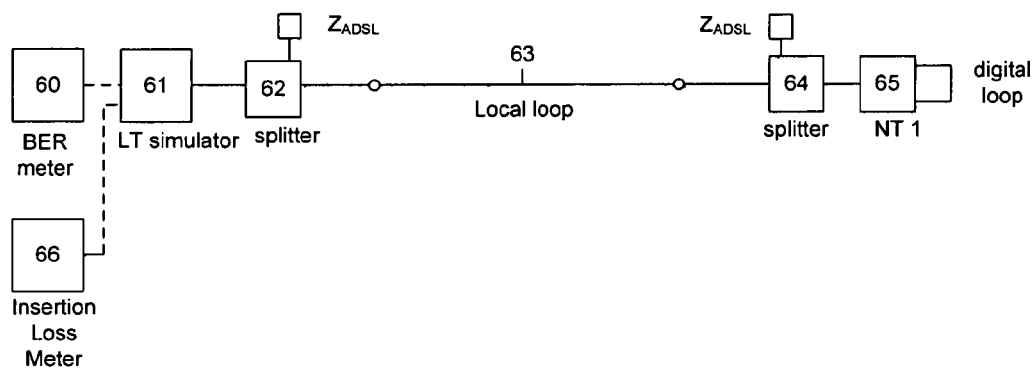
FIG. 6 shows a test set-up for measuring a length range.

Relationship between cable length and the problem: A test was conducted to determine whether the problem was reproducible in a laboratory set-up. As reported, this was found to be the case. With two splitters, the problem occurs over a large length range. With one splitter, it occurs over a smaller length range; it makes no major difference at which end of the cable the splitter is located. FIG. 6 shows the test set-up comprising a BER meter 60, an line termination simulator 61, a first splitter 62 (corresponding with splitter 7 in FIG. 10), a local loop 63 (corresponding with ISDN infrastructure 6 in FIG. 10), a second splitter 64 (corresponding with splitter 4 in FIG. 10) and a network termination 65 (corresponding with NT3 in FIG. 10). Table 1 summarizes the test results.

TABLE 1

Overview of length range in which the problem occurs

| | Functioning of ISDN line | | |
| --- | --- | --- | --- |
| Length of wire pair (in meters) | With one splitter (on NT1 side) | With one splitter (on LT side) | With two splitters |
| 0 | C | C | C |
| 200 | C | C | C |
| 400 | C | C | I |
| 600 | C | C | I |
| 800 | C | C | I |
| 1000 | C/I | C | I |
| 1200 | I | I | I |
| 1400 | C/I | C/I | I |
| 1600 | C | C/I | I |
| 1800 | C | C | I |
| 2000 | C | C | C/I |

TABLE 1-continued

Overview of length range in which the problem occurs

| Length of wire pair (in meters) | Functioning of ISDN line | | |
|---|---|---|---|
| | With one splitter (on NT1 side) | With one splitter (on LT side) | With two splitters |
| 2200 | C | C | C |
| 2400 | C | C | C |

Figure 7:
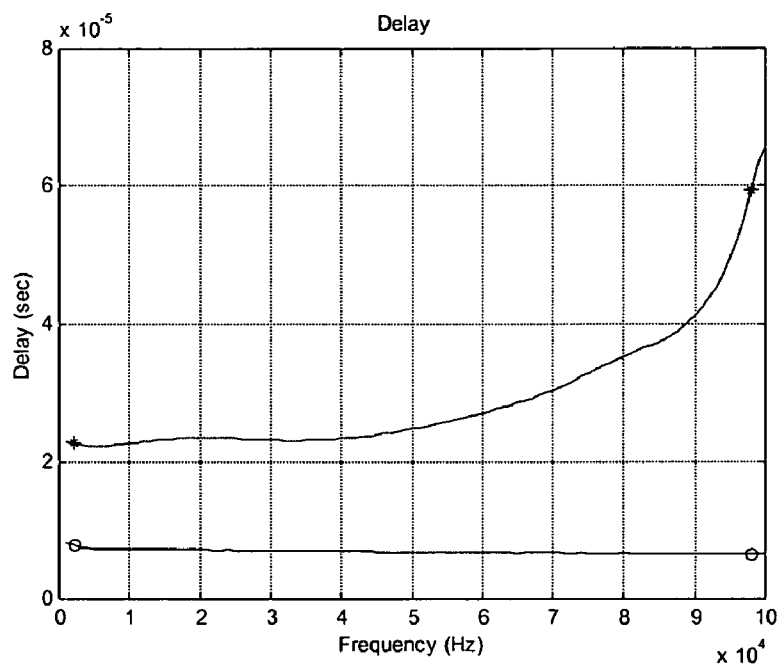
FIG. 7 shows a delay without and with splitters for a 1200 m cable, (o) without splitters and (*) with splitters.

Where:
C = Correct, i.e. start procedure and ISDN transmission take place correctly;
I = Incorrect, i.e. start and rest of procedure do not take place correctly ("time-out"); and
C/I = Start and ISDN transmission sometimes take place correctly and sometimes incorrectly Measurement of delay: The delay of signals through the wire pair (1200 m) was measured with and without splitters. FIG. 7 shows the results. Without splitters, the delay is virtually constant at all frequencies. With two splitters, the delay is far greater and increases at higher frequencies. It should be noted that the contribution made by the highest shown frequencies to ISDN transmission is small or negligible.

Recommendation G.961 also contains a delay graph that shows the behavior of the local loop. Drawing 5/G.961 presents a mask within which the group delay of a local loop will occur. The mask shows a group delay that is virtually constant above 20 kHz. The rising characteristic, as shown in FIG. 7 (with splitters), falls entirely outside the mask.

Figure 8:
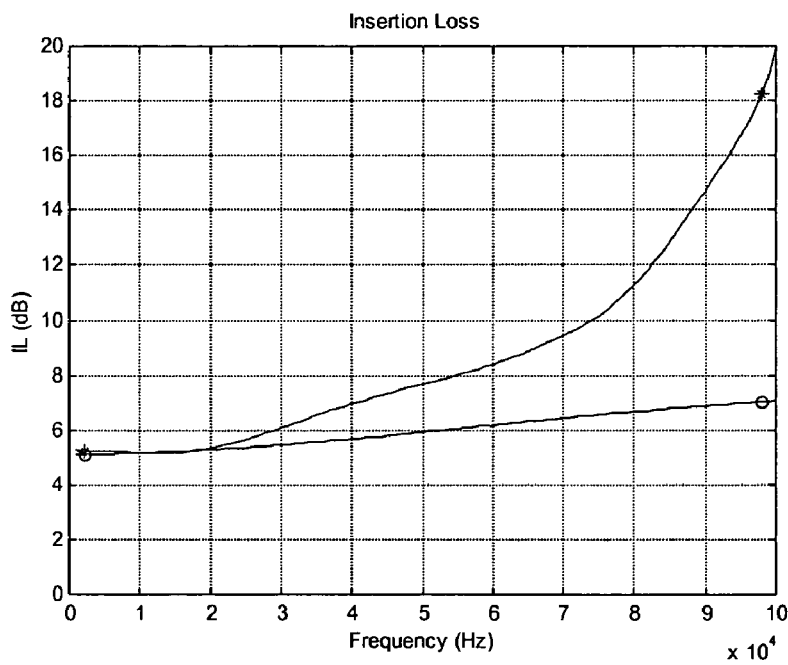
FIG. 8 shows a signal attenuation without and with splitters for a 1200 m cable, (o) without splitters and (*) with splitters.

Measurement of insertion loss: The insertion loss (IL) of the wire pair was measured without and with splitters. The set-up illustrated in FIG. 6 was used by replacing the BER meter 60 with an insertion loss meter 66. FIG. 8 shows the results. The increase is negligible in the range up to 20 kHz. Above 20 kHz, the splitters cause an increase, and above 70 kHz the increase becomes even greater, although the influence on transmission is no longer great.

The measured values shown in FIG. 8) for the local loop including splitters fall outside the mask in Recommendation G.961 (Drawing 4/G.961).

Figure 9:
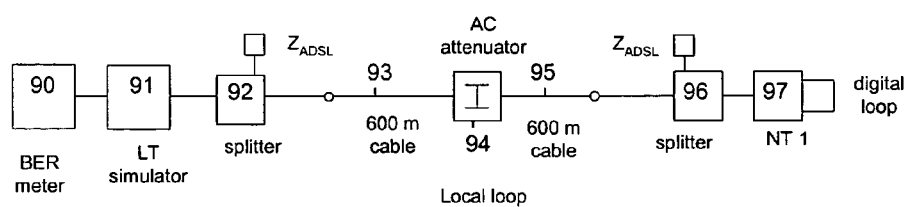
FIG. 9 shows a set-up used for a supplementary test.

Supplementary test: It became apparent after the above tests that the cause of the problem most probably had to be sought in echo cancellation or equalization. To examine this matter, an attenuator (attenuation network) was placed midway in the wire pair of 1200 meters. As this attenuator, just like NT1 and LT, had an impedance of 135Ω, the impedance interference seen by NT and LT after insertion of the attenuator corresponds with 600 meters of cable, while the signal distortion remains equal to 1200 meters. For the test, splitters were installed at the NT and LT ends of the cable. FIG. 9 shows the test set-up comprising a BER meter 90, a line termination simulator 91, a first splitter 92 (corresponding with splitter 7 in FIG. 10), a first 600 m cable 93 and an attenuator 94 and a second 600 m cable 95, (together corresponding with ISDN infrastructure 6 in FIG. 10), a second splitter 96 (corresponding with splitter 4 in FIG. 10) and a network termination 97 (corresponding with NT 3 in FIG. 10).

The result of this test showed that start-up and transmission were not possible. As no problem occurred in the test described before with an impedance interference of 600 m (see Table 1, columns 2 and 3), it may be concluded that the echo canceler of NT1 and LT are capable of withstanding an impedance interference of 600 meters. The circumstance that transmission did not work in this test shows with a very large degree of probability that the problem occurs in the equalizer and not in the echo cancellation, because as described above the echo cancellation still works properly with this amount of impedance interference.

The attenuation in this test reduces impedance interference to interference equal to 600 meters. However, the transmission parameters that determine signal transport (and signal distortion) from LT to NT and vice versa—like attenuation distortion and group delay distortion—are equal to 1200 meters in this test. At a distance of 1200 meters, the system, according to Table 1, never works. As the attenuator has a flat frequency and flat delay characteristic, the impedance interference decreases but signal distortion does not.

"Correct/"Incorrect" dividing line: Table 1 contains several references to the combination "C/I" to indicate that start-up occurred correctly sometimes and incorrectly other times. If it takes place correctly, there are no bit errors in the transmission. This indicates that start-up takes place incorrectly, but if the start occurs correctly the equalizer can compensate for the interference by the splitters to an extent that error-free transmission is possible. However, it is not known whether there will then still be just as much "margin" as in the situation without splitters. "Margin" is necessary to deal with faults and crosstalk without the occurrence of bit errors.

The number of problem cases: This problem was found to occur only in some of the ISDN connections on which ADSL was installed. The explanation for this situation is that only some of the customers have a cable length that falls within the error range, and of those customers only some have an NT1 of the S1 type. Type S1 exhibits this problem considerably, S4 slightly and, as far as known, S2 and S3 do not exhibit the problem at all.

To provide an understanding of the invention, the sequel describes preferred embodiments of the method and devices of the invention. It will be apparent to a person skilled in the art that other alternative and equivalent embodiments of the invention can be conceived and reduced to practice without departing form the true spirit of the invention, the scope of the invention being limited only by the appended claims as finally granted.

This invention further discloses a system for measuring the transmission characteristics of the ISDN infrastructure between the end-user location and the central location, and yet further discloses:

a) Using a configuration consisting of:
 a telephone 1 connected to a network termination 3,
 a computer device 2 connected to an ADSL modem 5,
 an ADSL splitter 4 on the one side connected to said network termination and said ADSL modem, and on the other side connected an ISDN infrastructure 6,
 a DSLAM 8 connected to a data-communication network,
 a telephone exchange 10 connected to a line termination 9,
 another ADSL splitter 7 on the one side connected to said ISDN infrastructure, and on the other side connected to said DSLAM and said line termination, wherein it is not possible to set up a connection between the telephone 1 and the telephone-exchange 10.

b) Usage according to a), wherein it is not possible to set up a connection between the computer device 2 and the DSLAM 8.

c) Usage according to a) or b), wherein the cause is located in the ADSL splitters 4 and 7.

d) Usage according to c), wherein the cause has an effect depending on the distance between the end-user location and the central location.

e) Usage according to c), wherein the cause has an effect depending on the type of the network termination 3.

f) Usage according to c), wherein the transmission characteristics of the ISDN infrastructure 6 are changed.

g) Usage according to f), wherein the transmission characteristics of the ISDN infrastructure 6 are the impedance, the propagation time and the insertion loss.

h) System for measuring the effect of the ADSL splitters 4 and 7 on the transmission characteristics of the ISDN infrastructure 6, the system comprising:
   means for measuring the impedance,
   means for measuring the propagation time,
   means for measuring the insertion loss.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not exclude that a combination of these measures can be used advantageously.

The invention claimed is:

1. Method for measuring an effect of at least one Asymmetrical Digital Subscriber Line splitter on at least one transmission characteristic of a system comprising an Integrated Service Digital Network infrastructure, the system further comprising a first Asymmetrical Digital Subscriber Line splitter connected to a local loop, the local loop connected to a second Asymmetrical Digital Subscriber Line splitter, and the second Asymmetrical Digital Subscriber Line splitter connected to an impedance, the method comprising the steps of:
   connecting an impedance meter to the first or second Asymmetrical Digital Subscriber Line splitter;
   measuring the at least one transmission characteristic comprising an impedance using the impedance meter;
   comparing the measured transmission characteristic with an internationally-defined range comprising a mask;
   identifying a transmission problem caused by the Asymmetrical Digital Subscriber Line splitter if the phase of the impedance falls outside the mask for some frequencies.

2. Method according to claim 1, further comprising the steps of:
   identifying a transmission problem with the Asymmetrical Digital Subscriber Line splitter if the phase has a positive value between 25 and 48 kHz and between 73 and 100 kHz.

3. Method for measuring an effect of at least one Asymmetrical Digital Subscriber Line splitter on at least one transmission characteristic of a system comprising an Integrated Service Digital Network infrastructure, the system further comprising a first Asymmetrical Digital Subscriber Line splitter connected to a local loop, the local loop connected to a second Asymmetrical Digital Subscriber Line splitter, and the second Asymmetrical Digital Subscriber Line splitter connected to an impedance, the method comprising:
   connecting a propagation time meter to the first or second Asymmetrical Digital Subscriber Line splitter;
   measuring the at least one transmission characteristic using the propagation time meter;
   comparing the measured transmission characteristic with an internationally-defined range;
   identifying a transmission problem caused by the Asymmetrical Digital Subscriber Line splitter if the delay of the measured transmission characteristics falls outside the range.

4. Method according to claim 3, wherein the internationally defined range comprises a mask defined by an international standard, further comprising the step of:
   identifying a transmission problem with the Asymmetrical Digital Subscriber Line splitter if the delay entirely falls outside this mask.

5. Method for measuring an effect of at least one Asymmetrical Digital Subscriber Line splitter on at least one transmission characteristic of a system comprising an Integrated Service Digital Network infrastructure, the system further comprising a Line Termination simulator connected to a first splitter, the first Asymmetrical Digital Subscriber Line splitter connected to a local loop, the local loop connected to a second Asymmetrical Digital Subscriber Line splitter, the second Asymmetrical Digital Subscriber Line splitter connected to a Network Termination and the Network Termination connected to a digital loop, the method comprising:
   connecting an insertion loss meter to the Line Termination simulator;
   measuring an insertion loss using the insertion loss meter;
   comparing the measured insertion loss with an internationally-defined range;
   identifying a transmission problem caused by the Asymmetrical Digital Subscriber Line splitter if the insertion loss for some frequencies falls outside the mask.

6. Method for measuring an effect caused by at least one Asymmetrical Digital Subscriber Line splitter on at least one transmission characteristic of a system comprising an Integrated Service Digital Network infrastructure, the system further comprising a Line Termination simulator connected to a first Asymmetrical Digital Subscriber Line splitter, the first Asymmetrical Digital Subscriber Line splitter connected to a local loop, the local loop comprising an AC attenuator, the local loop connected to a second Asymmetrical Digital Subscriber Line splitter, the second Asymmetrical Digital Subscriber Line splitter connected to a Network Termination and the network termination connected to a digital loop, the method comprising:
   connecting a Bit Error Meter to the Line Termination simulator;
   measuring the at least one transmission characteristic using the Bit Error Rate meter;
   comparing the at least one measured transmission characteristic with an internationally-defined range;
   identifying the correct or incorrect functioning of the Integrated Service Digital Network infrastructure in relation to a cable length of the Integrated Service Digital Network infrastructure.

7. Method according to claim 6 further comprising the steps of:
   identifying an at least sometimes incorrect functioning of the Integrated Service Digital Network infrastructure comprising one Asymmetrical Digital Subscriber Line splitter for cable lengths between 1000 and 1600 m;
   identifying an at least sometimes incorrect functioning of the Integrated Service Digital Network infrastructure comprising two Asymmetrical Digital Subscriber Line splitters for cable lengths between 400 and 2000 m.

* * * * *